(12) United States Patent
Arai et al.

(10) Patent No.: US 8,608,844 B2
(45) Date of Patent: *Dec. 17, 2013

(54) INK COMPOSITION, INK SET AND IMAGE FORMING METHOD

(75) Inventors: Yoshimitsu Arai, Ashigarakami-gun (JP); Masao Ikoshi, Ashigarakami-gun (JP); Koji Furukawa, Ashigarakami-gun (JP); Katsuyuki Hirato, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 554 days.

This patent is subject to a terminal disclaimer.

(21) Appl. No.: 12/369,475

(22) Filed: Feb. 11, 2009

(65) Prior Publication Data

US 2009/0202724 A1  Aug. 13, 2009

(30) Foreign Application Priority Data

Feb. 13, 2008 (JP) ................................ 2008-032171

(51) Int. Cl.
*C09D 11/02* (2006.01)

(52) U.S. Cl.
USPC ...................................................... 106/31.86

(58) Field of Classification Search
USPC ...................................................... 106/31.86
See application file for complete search history.

(56) References Cited

U.S. PATENT DOCUMENTS

| | | | |
|---|---|---|---|
| 4,418,098 A | 11/1983 | Maistrovich | |
| 5,958,121 A * | 9/1999 | Lin | 106/31.43 |
| 6,022,908 A * | 2/2000 | Ma et al. | 523/160 |
| 6,261,350 B1 | 7/2001 | Kabalnov | |
| 6,893,491 B2 * | 5/2005 | Yamazaki et al. | 106/31.86 |
| 7,122,077 B2 * | 10/2006 | Bauer et al. | 106/31.27 |
| 7,264,664 B2 | 9/2007 | Kamoto et al. | |
| 7,300,508 B2 | 11/2007 | Hiroki et al. | |
| 2001/0023266 A1 | 9/2001 | Miyabayashi | |
| 2002/0198287 A1 | 12/2002 | Ohta et al. | |
| 2003/0037699 A1 * | 2/2003 | Yatake | 106/31.58 |
| 2005/0004261 A1 | 1/2005 | Yatake | |
| 2005/0176847 A1 | 8/2005 | Cagle | |
| 2005/0204955 A1 * | 9/2005 | Nagashima et al. | 106/31.59 |
| 2007/0054981 A1 | 3/2007 | Yanagi et al. | |
| 2007/0068419 A1 * | 3/2007 | Goi et al. | 106/31.6 |
| 2007/0100022 A1 * | 5/2007 | Mubarekyan et al. | 523/160 |
| 2007/0197684 A1 | 8/2007 | Yamashita et al. | |
| 2007/0229577 A1 | 10/2007 | Morimoto | |
| 2007/0234931 A1 * | 10/2007 | Rehman | 106/31.6 |
| 2008/0055385 A1 | 3/2008 | Houjou | |
| 2008/0071007 A1 | 3/2008 | Spinelli | |
| 2008/0146729 A1 | 6/2008 | Yatake | |
| 2008/0151027 A1 * | 6/2008 | Held et al. | 347/100 |
| 2009/0202724 A1 | 8/2009 | Arai et al. | |
| 2009/0231366 A1 | 9/2009 | Arai et al. | |
| 2009/0246382 A1 | 10/2009 | Hirato et al. | |
| 2011/0166273 A1 | 7/2011 | Yatake | |

FOREIGN PATENT DOCUMENTS

| | | |
|---|---|---|
| EP | 0 778 321 A2 | 6/1997 |
| EP | 1 088 865 A1 | 4/2001 |
| EP | 1 132 438 A2 | 9/2001 |
| EP | 1 561 788 A1 | 8/2005 |
| JP | 9-176538 A | 7/1997 |
| JP | 2001-72905 A | 3/2001 |
| JP | 2001-302950 A | 10/2001 |
| JP | 2002-030092 A | 1/2002 |
| JP | 2002-30235 A | 1/2002 |
| JP | 2004-209762 A | 7/2004 |
| JP | 2005-220352 A | 8/2005 |
| JP | 2005-272790 A | 10/2005 |
| JP | 2007-145887 A | 6/2007 |
| JP | 2007-145928 A | 6/2007 |
| JP | 2007-152873 A | 6/2007 |
| JP | 2007-161753 A | 6/2007 |
| JP | 2007-245616 A | 9/2007 |
| JP | 2007-261206 A | 10/2007 |

OTHER PUBLICATIONS

Notice of Reasons for Rejection mailed Sep. 25, 2012, issued in corresponding Japanese Patent Application No. 2008-032171.
Notice of Reasons for Rejection issued in Japanese Application No. 2008-032171 mailed Apr. 2, 2013.

* cited by examiner

*Primary Examiner* — Kaj K Olsen
*Assistant Examiner* — Veronica F Faison
(74) *Attorney, Agent, or Firm* — Sughrue Mion, PLLC

(57) ABSTRACT

An ink composition, including: a water-soluble solvent A; a pigment; and water. The water-soluble solvent A contains at least a water-soluble solvent having an SP value of 27.5 or less at an amount of 90 mass % or more and a compound represented by the following Formula (1), wherein the compound represented by Formula (1) is the same as or different from the water-soluble solvent having an SP value of 27.5 or less:

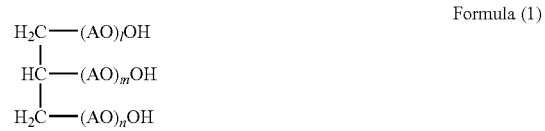

Formula (1)

wherein, in Formula (1), l, m and n each independently represent an integer of 1 or more, the total of l, m and n is from 3 to 15, and AOs each independently represents an ethyleneoxy group or propyleneoxy group.

17 Claims, No Drawings

INK COMPOSITION, INK SET AND IMAGE FORMING METHOD

CROSS-REFERENCE TO RELATED APPLICATION

This application claims priority under 35 USC 119 from Japanese Patent Application No. 2008-032171 filed on Feb. 13, 2008, the disclosure of which is incorporated by reference herein.

BACKGROUND OF THE INVENTION

1. Field of Invention

The invention relates to an ink composition, an ink set, and an image forming method.

2. Description of the Related Art

With the recent development of inkjet recording technology, inkjet recording methods have been applied for recording high quality images used as photographic or offset printing images, and therefore high quality image recording is demanded.

As ink that is capable of printing images with little ink bleed even on recycled paper and does not readily clog in an ink nozzle, an ink containing a saccharide-alkyleneoxy derivative or a mixture thereof has been disclosed (see, for example, Japanese Patent Application Laid-Open (JP-A) No. 2002-30092).

Further, an inkjet ink containing a water-soluble solvent with an SP value of 16.5 or more and less than 24.6 at an amount of 30 mass % or more with respect to the total weight of the ink, water at an amount of 10 mass % or more and less than 50 mass % with respect to the total amount of the ink, and a pigment which is dispersed with an alkali soluble polymer dispersant, has been disclosed (for example, see, JP-A No. 2007-145887).

Furthermore, an ink composition containing an ink composed of an aqueous dispersion of colored resin particles obtained by covering pigment particles with a film-forming resin having acid groups, at least a part of which is neutralized with basic groups, wherein the ink composition further includes a surfactant having an acetylene bond, has been disclosed (for example, see, JP-A No. 2001-302950).

SUMMARY OF THE INVENTION

However, in the techniques disclosed in JP-A No. 2002-30092, although an improvement in ink ejecting properties can be noticed to some extent, there remains a problem that curl of a recording medium is not suppressed merely by including a sugar alcohol derivative. Furthermore, although JP-A No. 2007-145887 discloses an inkjet ink having an excellent curl suppressing property for a recording medium, there are problems in that the stability of ink is deteriorated, and when the ink is used in combination with a medium with lower ink infiltration rate, interference between applied ink droplets tends to arise. Moreover, although JP-A No. 2001-302950 includes disclosure regarding improvements in the stability of ink ejecting properties and formation of high quality images, there remains the problem that curl of a recording medium cannot be suppressed.

In view of the above problems, the invention provides an ink composition having an excellent liquid stability and ejection property that can suppress curl of a recording medium after ink is applied onto the medium.

Further, the invention provides an ink set including plural ink compositions having different colors from each other, which has an excellent liquid stability and ejection property and can suppress curl of a recording medium after ink is applied onto the recording medium.

Furthermore, the invention provides an image forming method using the ink composition or the ink set, in which curl of a recording medium can be suppressed after the ink is applied onto the recording medium.

A first aspect of the invention provides an ink composition including a water-soluble solvent A, a pigment and water, the water-soluble solvent A containing a water-soluble solvent having an SP value of 27.5 or less at an amount of 90 mass % or more and a compound represented by the following Formula (1), wherein the compound represented by Formula (1) is the same as or different from the water-soluble solvent having an SP value of 27.5 or less:

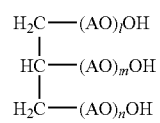

Formula (1)

In Formula (1), l, m and n each independently represent an integer of 1 or more, and the total of l, m and n is from 3 to 15. AOs each independently represent an ethyleneoxy group or propyleneoxy group.

A second aspect of the invention provides an ink composition of the first aspect, wherein each of the AO groups in the compound represented by Formula (1) is a propyleneoxy group.

A third aspect of the invention provides an ink composition of the first or second aspect, wherein the content of the compound represented by Formula (1) is 50 mass % or more with respect to the total amount of the water-soluble solvent A.

A fourth aspect of the invention provides an ink composition of any one of the first to third aspects, wherein the total of l, m and n is from 3 to 10.

A fifth aspect of the invention provides an ink composition of any one of the first to fourth aspects, wherein the amount of the water-soluble solvent A is from 10 mass % to 30 mass % with respect to the total amount of the ink composition.

A sixth aspect of the invention provides an ink composition of any one of the first to fifth aspects, wherein particles of the pigment have a polymer covering formed by phase inversion emulsification.

A seventh aspect of the invention provides an ink composition of the sixth aspect, wherein a resin (A) is used as a dispersant in the phase inversion emulsification, the resin (A) contains hydrophobic structural units (a) and hydrophilic structural units (b), the hydrophobic structural units (a) include a hydrophobic structural unit (a1) having an aromatic ring which is not directly bonded to an atom belonging to the main chain of the resin (A) at an amount of 40 mass % or more and a hydrophobic structural unit (a2) derived from an acrylic or methacrylic ester of an alkyl having 1 to 4 carbon atoms at an amount of 15 mass % or more, the hydrophilic structural units (b) include a hydrophilic structural unit (b1) derived from acrylic acid and/or methacrylic acid, and the hydrophilic structural units (b) are contained at an amount of 15 mass % or less with respect to the total amount of the resin (A).

An eighth aspect of the invention provides an ink composition of any one of the first to seventh aspects, further including a latex.

A ninth aspect of the invention provides an ink set including the ink composition of any one of the first to eighth aspects.

A tenth aspect of the invention provides an ink set of the ninth aspect, wherein the ink set includes plural ink compositions of the one of the first to eighth aspects, and the plural ink compositions having different colors from each other.

An eleventh aspect of the invention provides an ink set of the ninth aspect, further including another ink composition containing an aggregation promoter for the pigment in the ink composition of the one of the first to eighth aspects.

A twelfth aspect of the invention provides an ink set of the eleventh aspect, wherein the aggregation promoter is an acid.

A thirteenth aspect of the invention provides an image forming method including applying the ink composition of any one of the first to eighth aspects onto a recording medium.

A fourteenth aspect of the invention provides the image forming method of the thirteenth aspect, wherein the ink set of any one of the ninth to twelfth aspects is used for the application of the ink composition.

A fifteenth aspect of the invention provides an image forming method of the thirteenth or fourteenth aspect, wherein a heating process is performed after the application of the ink composition.

DETAILED DESCRIPTION OF THE INVENTION

Ink Composition

The ink composition of the invention contains a water-soluble solvent A, a pigment, and water. The water-soluble solvent A contains (i) a water-soluble solvent having an SP value of 27.5 or less at an amount of 90 mass % or more and (ii) the compound represented by Formula (1), wherein the compound represented by Formula (1) is the same as or different from the water-soluble solvent having an SP value of 27.5 or less.

Here, the "water-soluble solvent A" in the invention means the total water-soluble solvent included in the ink composition, and the "water-soluble solvent" in the invention means a solvent of which 5 g or more can dissolve in 100 g of water.

The ink composition of the invention with the above composition has excellent liquid stability and liquid ejecting stability, and can effectively suppress curl of a recording medium after the ink is applied onto the recording medium.

The ink composition of the invention (hereinafter, sometimes referred to as "ink") is preferably used as an inkjet recording ink.

The inkjet recording liquid of the invention can be used for a full color image formation. The inkjet recording liquid may be used as at least one of, or each of, the inks for forming a full color image. In order to form a full color image, a magenta color ink, a cyan color ink, and a yellow color ink can be used. In order to adjust a color tone, a black color ink may be used additionally. Other than yellow, magenta, and cyan color inks, at least one of a red ink, a green ink, a blue ink, a white ink, or an ink having a special color used in the field of printing may be used.

The ink composition of the invention is preferably an aqueous ink when the ink is used as an inkjet recording ink. In particular, a water-dispersible pigment is preferably used as a color pigment.

The structural components of an ink composition will be described in detail below.

Water-Soluble Solvent A

The ink composition includes a water-soluble solvent that may serve as an anti-drying agent, a wetting agent, or a penetration accelerator.

In particular, when the ink composition of the invention is used as an aqueous ink composition for an inkjet recording system, a water-soluble organic solvent is preferably used as an anti-drying agent, a wetting agent, or a penetration accelerator.

At least one of the anti-drying agent or the wetting agent may be used for the purpose of preventing clogging of an inkjet nozzle due to drying of the inkjet ink. As the anti-drying agent or the wetting agent, a water-soluble organic solvent with a lower vapor pressure than that of water is preferable.

Further, in view of facilitating infiltration of the ink composition (particularly when the ink composition is an inkjet ink composition) into paper, a water-soluble organic solvent is preferably used as the penetration accelerator.

In the invention, in order to suppress a curl of a recording medium, the water soluble solvent A contains (i) a water-soluble solvent with an SP value of 27.5 or less at an amount of 90 mass % or more and (ii) a compound represented by the following Formula (1).

Here, the "water-soluble solvent with an SP value of 27.5 or less" may be the same as or different from the "compound represented by Formula (1)".

The solubility parameter (SP value) of a water-soluble solvent as used in the invention is a value expressed by the square root of cohesive energy of molecules. SP values can be calculated by the method described in R. F. Fedors, *Polymer Engineering Science,* 14, pp. 147 (1967). The values used in this invention are calculated by this method.

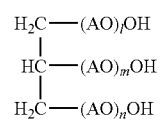

Formula (1)

In Formula (1), l, m and n each independently represent an integer of 1 or more, and the total of l, m and n is from 3 to 15.

When the total of l, m and n is less than 3, the ability to prevent curl of a recording medium becomes small, and when the total of l, m and n exceeds 15, the ink ejecting property is deteriorated.

In particular, the total of l, m and n is preferably from 3 to 12, and more preferably from 3 to 10.

In Formula (1), AOs each independently represent an ethyleneoxy group or a propyleneoxy group. In particular, a propyleneoxy group is preferable.

In an embodiment, l represents 1, or l represents an integer of 2 or more and plural AOs in $(AO)_l$ are the same as each other; m represents 1, or m represents an integer of 2 or more and plural AOs in $(AO)_m$ are the same as each other; and n represents 1, or n represents an integer of 2 or more and plural AOs in $(AO)_n$ are the same as each other. In this particular embodiment, the AO in $(AO)_l$ may be the same as or different from the AO in $(AO)_m$; the AO in $(AO)_l$ may be the same as or different from the AO in $(AO)_n$; and the AO in $(AO)_m$ may be the same as or different from the AO in $(AO)_n$.

Examples of the water-soluble solvent having an SP value of 27.5 or less and the compound represented by Formula (1) are shown below together with the SP values thereof (within the parenthesis). However, the invention is not limited thereto.

diethyleneglycol monoethylether (22.4);
diethyleneglycol monobutylether (21.5);
triethyleneglycol monobutylether (21.1);
dipropyleneglycol monomethylether (21.3); and
dipropyleneglycol (27.2).

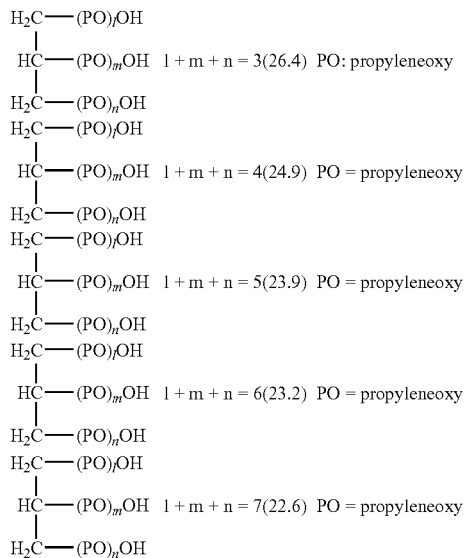

$nC_4H_9O(AO)_4$-H(AO=EO or PO (the ratio of EO:PO=1:1)) (20.1);
$nC_4H_9O(AO)_{10}$-H(AO=EO or PO (the ratio of EO:PO=1:1)) (18.8);
$HO(A'O)_{40}$-H(A'O=EO or PO (the ratio of EO:PO=1:3)) (18.7);
$HO(A'O)_{55}$-H(A"O=EO or PO (the ratio of EO:PO=5:6)) (18.8);
$HO(PO)_3$-H (24.7);
$HO(PO)_7$-H (21.2); and
1,2-hexanediol (27.4)

In the invention, EO and PO represent an ethyleneoxy group and a propyleneoxy group, respectively.

The ratio (content) of the compound represented by Formula (1) in the water-soluble solvent A is preferably 10 mass % or more, more preferably 30 mass % or more, and even more preferably 50 mass % or more. A higher content does not cause problems.

It is preferable that the content is within the above ranges, since the curl of the recording medium can be suppressed without deteriorating the ink stability and ink ejecting property.

In the invention, at least one other additional solvent may be used together with the water-soluble solvent as long as the content of the water-soluble solvent with the SP value of 27.5 or less is 90 mass % or more.

Examples of the additional water-soluble organic solvent include polyhydric alcohols including glycerin, 1,2,6-hexanetriol, trimethylolpropane, and alkanediols such as ethyleneglycol, propyleneglycol, diethyleneglycol, triethyleneglycol, tetraethyleneglycol, pentaethyleneglycol, dipropyleneglycol, 2-butene-1,4-diol, 2-ethyl-1,3-hexanediol, 2-methyl-2,4-pentanediol, 1,2-octanediol, 1,2-hexanediol, 1,2-pentanediol, or 4-methyl-1,2-pentanediol; so-called solid wetting agents including saccharides such as glucose, mannose, fructose, ribose, xylose, arabinose, galactose, aldonic acid, glucitol (sorbit), maltose, cellobiose, lactose, sucrose, trehalose or maltotriose; sugar alcohols; hyaluronic acids; and ureas; alkyl alcohols having 1 to 4 carbon atoms such as ethanol, methanol, butanol, propanol or isopropanol;

glycol ethers such as ethyleneglycol monomethyl ether, ethyleneglycol monoethyl ether, ethyleneglycol monobutyl ether, ethyleneglycol monomethyl ether acetate, diethyleneglycol monomethyl ether, diethyleneglycol monoethyl ether, diethyleneglycol mono-n-propyl ether, ethyleneglycol mono-iso-propyl ether, diethyleneglycol mono-iso-propyl ether, ethyleneglycol mono-n-butyl ether, ethyleneglycol mono-t-butyl ether, diethyleneglycol mono-t-butyl ether, 1-methyl-1-methoxybutanol, propyleneglycol monomethyl ether, propyleneglycol monoethyl ether, propyleneglycol mono-t-butyl ether, propyleneglycol mono-n-propyl ether, propyleneglycol mono-iso-propyl ether, dipropyleneglycol monomethyl ether, dipropyleneglycol monoethyl ether, dipropyleneglycol mono-n-propyl ether or dipropyleneglycol mono-iso-propyl ether; 2-pyrrolidone, N-methyl 2-pyrrolidone, 1,3-dimethyl-2-imidazolidinone, formamide, acetamide, dimethylsulfoxide, sorbit, sorbitan, acetin, diacetin, triacetin, and sulfolane. The additional water-soluble organic solvent may be used singly, or in combination of two or more thereof.

When the additional water-soluble organic solvent is used for the purpose of an anti-drying agent or a wetting agent, the additional water-soluble organic solvent is preferably a polyhydric alcohol, and examples thereof include glycerin, ethyleneglycol, diethyleneglycol, triethyleneglycol, propyleneglycol, dipropyleneglycol, tripropyleneglycol, 1,3-butanediol, 2,3-butanediol, 1,4-butanediol, 3-methyl-1,3-butanediol, 1,5-pentanediol, tetraethyleneglycol, 1,6-hexanediol, 2-methyl-2,4-pentanediol, polyethyleneglycol, 1,2,4-butanetriol, and 1,2,6-hexanetriol. The additional water-soluble organic solvent as an anti-drying agent or a wetting agent may be used singly, or in combination of two or more thereof.

When the additional water-soluble organic solvent is used for the purpose of a penetrating agent, the additional water-soluble organic solvent is preferably a polyol compound. Examples of the polyol compound include aliphatic diols such as 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, 5-hexene-1,2-diol, 2-ethyl-1,3-hexanediol, or 2,2,4-trimethyl-1,3-pentanediol. Among these compounds, 2-ethyl-1,3-hexanediol and 2,2,4-trimethyl-1,3-pentanediol are preferable.

The water-soluble solvent used in the invention may be used singly, or two or more kinds thereof may be mixed and used.

From the viewpoint of maintaining the stability and ejection reliability of ink, the content of the water-soluble solvent A is preferably from 1 mass % to 60 mass %, more preferably from 5 mass % to 40 mass %, and particularly preferably from 10 mass % to 30 mass %, with respect to the total amount of the ink composition.

Although the addition amount of water used for the invention is not particularly limited, from the viewpoint of maintaining the stability and ejection reliability of ink, the addition amount of water is preferably from 10 mass % to 99 mass %, more preferably from 30 mass % to 80 mass %, and even more preferably from 50 mass % to 70 mass %, with respect to the total amount of the ink composition.

Pigment

The pigment used in the invention is not specifically limited, and may be appropriately selected depending on the purposes. For example, the pigment may be either an organic pigment or an inorganic pigment, or both.

Examples of the organic pigment include azo pigments, polycyclic pigments, dye chelates, nitro pigments, nitroso pigments and aniline black. In particular, azo pigments and polycyclic pigments are preferable.

Examples of the azo pigments include an azo lake pigment, an insoluble azo pigment, a condensed azo pigment, and a chelate azo pigment.

Examples of the polycyclic pigments include a phthalocyanine pigment, a perylene pigment, a perynone pigment, an anthraquinone pigment, a quinacridone pigment, a dioxazine pigment, an indigo pigment, a thioindigo pigment, an isoindolinone pigment, and a quinofraron pigment.

Examples of the dye chelates include basic dye chelate pigments and acid dye chelate pigments.

Examples of the inorganic pigments include titanium oxide, iron oxide, calcium carbonate, barium sulfate, aluminum hydroxide, barium yellow, cadmium red, chrome yellow, and carbon black. Among these pigments, carbon black is particularly preferable. The carbon black may be, for example, a carbon black manufactured by a known method such as a contact method, a furnace method or a thermal method.

Examples of black pigments include carbon blacks such as RAVEN 7000, RAVEN 5750, RAVEN 5250, RAVEN 5000 ULTRAII, RAVEN 3500, RAVEN 2000, RAVEN 1500, RAVEN 1250, RAVEN 1200, RAVEN 1190 ULTRAII, RAVEN 1170, RAVEN 1255, RAVEN 1080, RAVEN 1060 or RAVEN 700 (trade names, manufactured by Columbian Chemicals Co.); REGAL 400R, REGAL 330R, REGAL 660R, MOGUL L, BLACK PEARLS L, MONARCH 700, MONARCH 800, MONARCH 880, MONARCH 900, MONARCH 1000, MONARCH 1100, MONARCH 1300 or MONARCH 1400 (trade names, manufactured by Cabot Corporation); COLOR BLACK FW1, COLOR BLACK FW2, COLOR BLACK FW2V, COLOR BLACK 18, COLOR BLACK FW200, COLOR BLACK S150, COLOR BLACK S160, COLOR BLACK S170, PRINTEX 35, PRINTEX U, PRINTEX V, PRINTEX 140U, PRINTEX 140V, SPECIAL BLACK 6, SPECIAL BLACK 5, SPECIAL BLACK 4A or SPECIAL BLACK 4 (trade names, manufactured by Degussa); No. 25, No. 33, No. 40, No. 45, No. 47, No. 52, No. 900, No. 2200B, No. 2300, MCF-88, MA600, MA7, MA8 or MA100 (trade names, manufactured by Mitsubishi Chemical Corporation). However, in the invention, the black pigments are not limited thereto.

Organic pigments usable in the invention include yellow ink pigments such as C.I. Pigment Yellow 1, 2, 3, 4, 5, 6, 7, 10, 11, 12, 13, 14, 14C, 16, 17, 24, 34, 35, 37, 42, 53, 55, 65, 73, 74, 75, 81, 83, 93, 95, 97, 98, 100, 101, 104, 108, 109, 110, 114, 117, 120, 128, 129, 138, 150, 151, 153, 154, 155 or 180.

Organic pigments usable in the invention further include magenta ink pigments such as C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 48 (Ca), 48 (Mn), 48:2, 48:3, 48:4, 49, 49:1, 50, 51, 52, 52:2, 53:1, 53, 55, 57 (Ca), 57:1, 60, 60:1, 63:1, 63:2, 64, 64:1, 81, 83, 87, 88, 89, 90, 101 (iron oxide red), 104, 105, 106, 108 (cadmium red), 112, 114, 122 (quinacridone magenta), 123, 146, 149, 163, 166, 168, 170, 172, 177, 178, 179, 184, 185, 190, 193, 202, 209, 219, 269 or C.I. pigment violet 19. Among these pigments, C.I. pigment red 122 is particularly preferable.

Furthermore, organic pigments usable in the invention further include cyan ink pigments such as C.I. Pigment Blue 1, 2, 3, 15, 15:1, 15:2, 15:3, 15:34, 16, 17:1, 22, 25, 56, 60, C.I. Bat Blue 4, 60 or 63. Among these pigments, C.I. Pigment Blue 15:3 is particularly preferable.

The pigment may be used singly or in combination of two or more thereof, each of which may be selected from the above classes of pigments and may belong to the same class as each other or different classes from each other.

The pigment used in the invention is preferably selected from the following water-dispersible pigments (1) to (4), from the viewpoint of the liquid stability and liquid ejection stability.

Water Dispersible Pigment

Examples of the water dispersible pigment include the following classes (1) to (4):

(1) An encapsulated pigment, that is, a polymer emulsion formed by incorporating a pigment into polymer particles; more specifically, in the polymer emulsion, pigment particles are dispersed in water and have a resin layer formed of a hydrophilic water-insoluble resin that covers the surfaces of the pigment particles and imparts hydrophilicity to the pigment particles;

(2) A self-dispersing pigment, that is, a pigment having at least one type of hydrophilic group on a surface thereof and exhibiting at least one of water-dispersibility or water-solubility in the absence of a dispersant; more specifically, the pigment is prepared by subjecting the surfaces of pigment particles (such as carbon black particles) to an oxidizing treatment so as to impart hydrophilicity to the pigment particles and so as to enable the pigment itself to disperse in water;

(3) A resin dispersed pigment, that is, a pigment dispersed using a water-soluble polymer compound having a weight average molecular weight of 50,000 or less; and (4) A surfactant-dispersed pigment, that is, a pigment dispersed using a surfactant.

Among these pigments, (1) an encapsulated pigment and (2) a self-dispersing pigment are preferable, and (1) an encapsulated pigment is particularly preferable.

In the following, the encapsulated pigment will be described in detail.

The resin used in the encapsulated pigment is not specifically limited, but is preferably a polymer compound that is self-dispersible or dissolvable in a mixed solvent of water and a water-soluble organic solvent and that has an anionic (acidic) group. In general, the number average molecular weight of the resin is preferably in the range of about 1000 to about 100,000, and particularly preferably in the range of about 3000 to about 50,000. The resin is preferably a resin that can dissolve in an organic solvent to form a solution. When the number average molecular weight of a resin is within the above ranges, the resin can exhibit sufficient function as a cover layer on pigment particles or as a coated layer on an ink component in an ink composition. The resin is preferably used in the form of an alkali metal salt or an organic amine salt.

The resin used for the encapsulated pigment may be, for example, a material having an anionic group, and examples thereof include thermoplastic, thermosetting, or modified resins of the following types of resin: an acrylic resin, an epoxy resin, a polyurethane resin, a polyether resin, a polyamide resin, an unsaturated polyester resin, a phenol resin, a silicone resin, a fluoropolymer compound; a polyvinyl resin such as polyvinyl chloride, polyvinyl acetate, polyvinyl alcohol or polyvinyl butyral; a polyester resin such as an alkyd resin or a phthalic acid resin; an amino resin such as a melamine resin, a melamine-formaldehyde resin, an aminoalkid co-condensed resin, a urea formaldehyde resin, or a urea resin; and copolymers and mixtures of two or more of these resins.

Of the above resins, an anionic acrylic resin can be obtained, for example, by polymerizing, in a solvent, an acrylic monomer having an anionic group (hereinafter, referred to as an anionic group-containing acrylic monomer) and, optionally, one or more other monomers copolymerizable with the anionic group-containing acrylic monomer. Examples of the anionic group-containing acrylic monomer include an acrylic monomer having one or more anionic groups selected from the group consisting of a carboxylic group, a sulfonic acid group and a phosphonic group. Among these monomers, an acrylic monomer having a carboxyl group is preferable.

Examples of the acrylic monomer having a carboxyl group include acrylic acid, methacrylic acid, crotonic acid, ethacrylic acid, propylacrylic acid, isopropylacrylic acid, itaconic acid and fumaric acid. Among these monomers, acrylic acid and methacrylic acid are preferable.

An encapsulated pigment can be manufactured by a conventional physical and/or chemical method by using the above components. According to a preferable embodiment of the invention, the encapsulated pigment can be manufactured by the methods described in JP-A Nos. 9-151342, 10-140065, 11-209672, 11-172180, 10-25440, or 11-43636.

In the present invention, a self-dispersing pigment is an example of a preferable pigment. A self-dispersing pigment is a pigment in which a number of hydrophilic functional groups and/or a salt thereof (hereinafter, referred to as a dispersibility-imparting group) are directly or indirectly (via an alkyl group, an alkyl ether group, an aryl group or the like) bonded to the surfaces of particles of the pigment, so that the pigment particles can be dispersed in an aqueous medium without a dispersant. Here, the term "dispersed in an aqueous medium without a dispersant", indicates a state in which the pigment particles are dispersible in the aqueous medium even when a dispersant for dispersing the pigment is not used.

An ink containing a self-dispersing pigment as a colorant does not need to contain a dispersant, which is otherwise contained for dispersing a usual pigment. Therefore, the ink containing a self-dispersing pigment is free from decrease in defoaming properties due to a dispersant, and generation of foam is hardly observed in the ink containing a self-dispersing pigment; accordingly an ink with excellent ink ejection stability can be easily prepared.

Examples of dispersibility-imparting groups to be bonded to the surfaces of self-dispersing pigment particles include —COOH, —CO, —OH, —$SO_3H$, —$PO_3H_2$, and a quaternary ammonium, and salts thereof. A self-dispersing pigment can be manufactured by subjecting a pigment as a raw material to a physical or chemical treatment so as to bond (graft) a dispersibility-imparting group or an active species having a dispersibility-imparting group to the surfaces of the pigment particles. Examples of the physical treatment include a vacuum plasma treatment. Examples of the chemical treatment include a wet oxidizing method in which surfaces of pigment particles are oxidized by an oxidizing agent in water and a method in which p-aminobenzoic acid is bonded to surfaces of pigment particles whereby a carboxyl group is linked to the pigment particles through the phenyl group.

In the invention, preferable examples of the self-dispersing pigment include a self-dispersing pigment whose surface has been subjected to an oxidation treatment with a hypohalous acid and/or hypohalite and a self-dispersing pigment whose surface has been subjected to an oxidation treatment with ozone. Commercially available products may also be used as the self-dispersing pigment. Examples thereof include, MICROJET CW-1 (trade name, manufactured by Orient Chemical Industry), and CAB-O-JET200 and CAB-O-JET300 (trade names, manufactured by Cabot Corporation).

In the invention, the content of the pigment is preferably from 0.1 mass % to 15 mass %, more preferably from 0.5 mass % to 12 mass %, and particularly preferably from 1 mass % to 10 mass %, with respect to the total amount of the ink composition, in consideration of coloring properties, graininess, ink stability and ink ejection reliability.

Dispersant

In the invention, the dispersant used in an encapsulated pigment or a resin dispersed pigment may be selected from a nonionic compound, an anionic compound, a cationic compound, or an amphoteric compound.

The dispersant is, for example, a copolymer formed from monomers having an $\alpha,\beta$-ethylenic unsaturated group. Examples of the monomers having an $\alpha,\beta$-ethylenic unsaturated group include ethylene, propylene, butene, pentene, hexene, vinyl acetate, allyl acetate, acrylic acid, methacrylic acid, crotonic acid, a crotonic acid ester, itaconic acid, an itaconic acid monoester, maleic acid, a maleic acid monoester, a maleic acid diester, fumaric acid, a fumaric acid monoester, vinyl sulfonic acid, styrene sulfonic acid, sulfonated vinyl naphthalene, vinyl alcohol, acrylamide, methacryloxy ethyl phosphate, bismethacryloxyethyl phosphate, methacryloxyethylphenyl acid phosphate, ethyleneglycol dimethacrylate, diethyleneglycol dimethacrylate, styrene, styrene derivatives such as $\alpha$-methyl styrene or vinyltoluene; vinyl cyclohexane, vinyl naphthalene, vinyl naphthalene derivatives, an alkyl acrylate which may have an aromatic substituent, phenyl acrylate, an alkyl methacrylate which may have an aromatic substituent, phenyl methacrylate, a cycloalkyl methacrylate, an alkyl crotonate, a dialkyl itaconate, a dialkyl maleate, vinyl alcohol, and derivatives of the above compounds.

A homopolymer formed by polymerization of one kind of monomer having an $\alpha,\beta$-ethylenic unsaturated group, which may be selected from the above monomers, or a copolymer formed by copolymerization of plural kinds of monomer having an a, 0-ethylenic unsaturated group, each of which may be selected from the above monomers, may be used as a polymer dispersant.

Examples of the dispersant include an alkyl acrylate-acrylic acid copolymer, an alkyl methacrylate-methacrylic acid copolymer, a styrene-alkyl acrylate-acrylic acid copolymer, styrene-phenyl methacrylate-methacrylic acid copolymer, a styrene-cyclohexyl methacrylate-methacrylic acid copolymer, a styrene-styrene sulfonic acid copolymer, a styrene-maleic acid copolymer, a styrene-methacrylic acid copolymer, a styrene-acrylic acid copolymer, a vinyl naphthalene-maleic acid copolymer, a vinyl naphthalene-methacrylic acid copolymer, a vinyl naphthalene-acrylic acid copolymer, polystyrene, a polyester, and polyvinyl alcohol.

Among these dispersants, the following resin (A) is preferable as a dispersant.

Resin (A)

The resin (A) is used as a dispersant for dispersing the pigment in an aqueous liquid medium.

The resin (A) includes hydrophobic structural units (a) and hydrophilic structural units (b). If needed, the resin (A) may include structural units (c) that are different from both of the hydrophobic structural units (a) and the hydrophilic structural units (b).

While the composition of the hydrophobic structural units (a) and the hydrophilic structural units (b) varies with the degree of the hydrophilicity of the structural units (b) or the hydrophobicity of the structural units (a), the content of hydrophobic structural units (a) is preferably in excess of 80 mass %, and more preferably 85 mass % or more, with respect to the total mass of the resin (A). That is, the content of the hydrophilic structural units (b) is preferably less than 20 mass %, and more preferably 15 mass % or less. When the content of the hydrophilic structural units (b) is 20 mass % or more, the amount of components independently dissolving in an aqueous liquid medium without contributing to the dispersion of the pigment increases, so that various characteristics, such as dispersibility, of the pigment are deteriorated, resulting in deterioration in the ink ejecting property of the inkjet recording ink.

Hydrophobic Structural Units (a)

In the resin (A) of the invention, the hydrophobic structural units (a) include at least a hydrophobic structural unit (a1) having an aromatic ring which is not directly bonded to an atom belonging to the main chain of the resin (A).

Here, "not directly bonded to" means a structure in which the aromatic ring is linked to an atom belonging to the main chain structure of the resin through a linking group. Since such a structure maintains an adequate distance between the hydrophobic aromatic ring and a hydrophilic structural unit in the resin (A), an interaction between the resin (A) and the pigment is enhanced, whereby the resin (A) is firmly adsorbed to the pigment and the dispersibility of the pigment is improved.

Hydrophobic Structural Unit (a1) Having Aromatic Ring

The content of the hydrophobic structural unit (a1) having an aromatic ring which is not directly bonded to an atom belonging to the main chain of the resin (A), is preferably from 40 mass % to less than 75 mass %, more preferably from 40 mass % to less than 70 mass %, and particularly preferably from 40 mass % to less than 60 mass %, with respect to the total mass of the resin (A), in consideration of the dispersion stability of the pigment, the ejection stability and the washability.

When the content of the hydrophobic structural unit (a1) including the aromatic ring is in the above range, the rubbing resistance, ink stability and ink ejection reliability can be enhanced.

The content of the aromatic ring which is not directly bonded to an atom belonging to the main chain of the resin (A) is preferably from 15 mass % to 27 mass %, more preferably from 15 mass % to 25 mass %, and particularly preferably from 15 mass % to 20 mass %, with respect to the total amount of the resin (A), from the viewpoint of improving rubbing resistance.

When the content of the aromatic ring in the unit (a1) are in the above ranges, the rubbing resistance, ink stability and ink ejection reliability can be enhanced.

In the invention, the hydrophobic structural unit (a1) containing the aromatic ring in the hydrophobic structural units (a) is preferably included in the resin (A) by taking a structure represented by the following Formula (2);

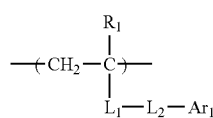

Formula (2)

In Formula (2), $R_1$ represents a hydrogen atom, a methyl group or a halogen atom, $L_1$ represents —COO—, —OCO—, —CONR$_2$—, —O—, or a substituted or unsubstituted phenylene group wherein the left side in each structure corresponds to the main chain side, and $R_2$ represents a hydrogen atom or an alkyl group having 1 to 10 carbon atoms. $L_2$ represents a single bond or a divalent linking group having 1 to 30 carbon atoms. If $L_2$ represents a divalent linking group, the linking group preferably has 1 to 25 carbon atoms, and particularly preferably has 1 to 20 carbon atoms. Here, examples of the substituent include, but are not limited to, a halogen atom, an alkyl group, an alkoxy group, a hydroxyl group, and a cyano group. $Ar_1$ represents a monovalent group derived from an aromatic ring.

In Formula (2), a combination is preferable in which $R_1$ represents a hydrogen atom or a methyl group, $L_1$ represents —COO— (the left side of the chemical formula representing the main chain side), and $L_2$ represents a divalent linking group having 1 to 25 carbon atoms and containing an alkyleneoxy group and/or an alkylene group. A combination is more preferable in which $R_1$ represents a hydrogen atom or a methyl group, $L_1$ represents —COO— (the left side of the chemical formula representing the main chain side), and $L_2$ represents —(CH$_2$—CH$_2$—O)$_n$— (where n represents the average number of repeating units and is from 1 to 6, the left side of the chemical formula representing the main chain side).

The aromatic ring of $Ar_1$ contained in the hydrophobic structural unit (a1) is not particularly limited, and examples thereof include a benzene ring, a condensed aromatic ring having 8 or more carbon atoms, a heterocyclic ring condensed with an aromatic ring, and connected benzene rings in which two or more benzene rings are connected.

The condensed aromatic ring having 8 or more carbon atoms is an aromatic compound having 8 or more carbon atoms and containing an aromatic ring formed by condensation of two or more benzene rings and/or a ring formed by at least one type of aromatic ring and an alicyclic hydrocarbon condensed with the aromatic ring. Specific examples thereof include naphthalene, anthracene, fluorene, phenanthrene, and acenaphthene.

The heterocyclic ring condensed with an aromatic ring is a compound containing a condensed ring in which an aromatic compound (preferably a benzene ring) not containing a hetero atom and a cyclic compound containing a hetero atom are condensed with each other. Here, the cyclic compound containing a hetero atom is preferably a 5-membered ring or a 6-membered ring. As the hetero atom, a nitrogen atom, an oxygen atom, or a sulfur atom is preferred. The cyclic compound containing a hetero atom may contain plural hetero atoms. In this case, the hetero atoms may be the same as each other or different from each other. Specific examples of the heterocyclic ring condensed with an aromatic ring include phthalimide, acridone, carbazole, benzoxazole, and benzothiazole.

Specific examples of a monomer that can form a hydrophobic structural unit (a1) containing a monovalent group derived from the benzene ring, the condensed aromatic ring having 8 or more carbon atoms, the heterocyclic ring condensed with an aromatic ring, or the two or more connected benzene rings are shown below, but the invention is not restricted to the following examples.

M-1 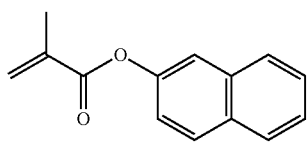
M-2 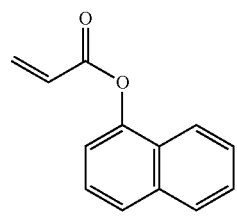
M-3 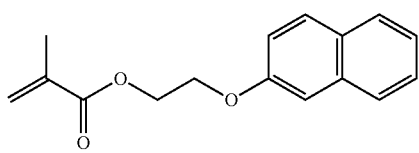
M-4 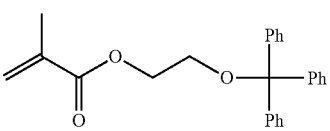
M-5 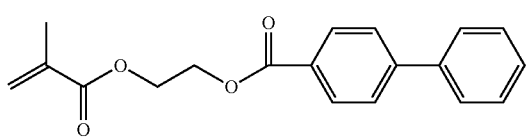
M-6 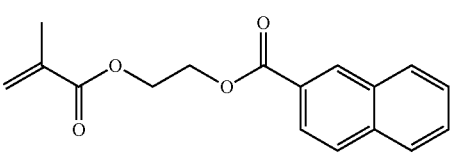
M-7 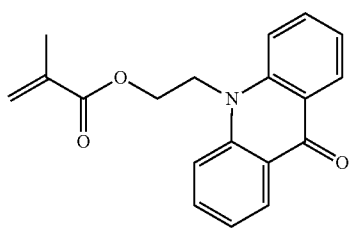
M-8 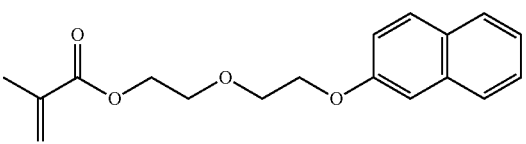
M-9 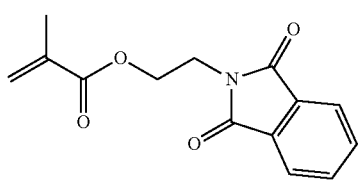
M-10 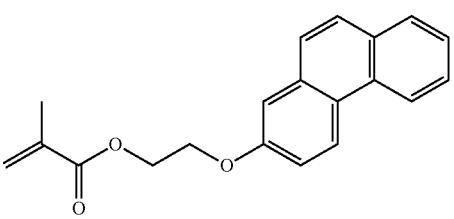
M-11 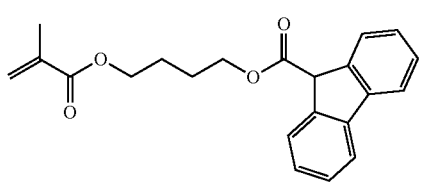
M-12 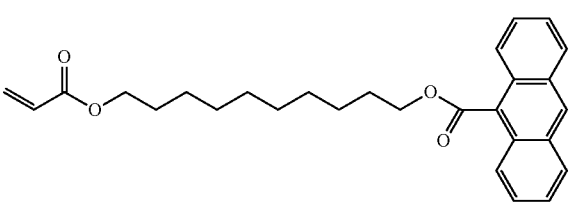
M-13 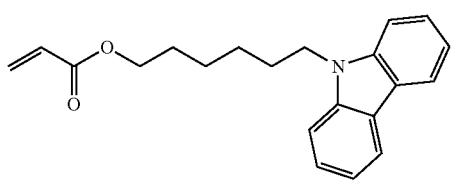
M-14 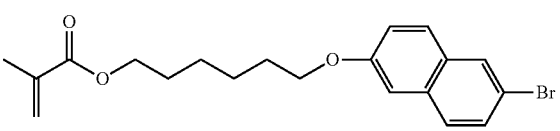
M-15 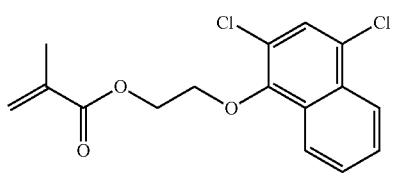
M-16 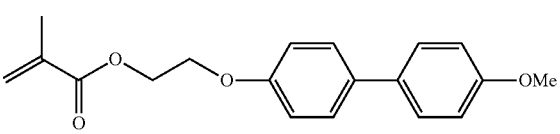

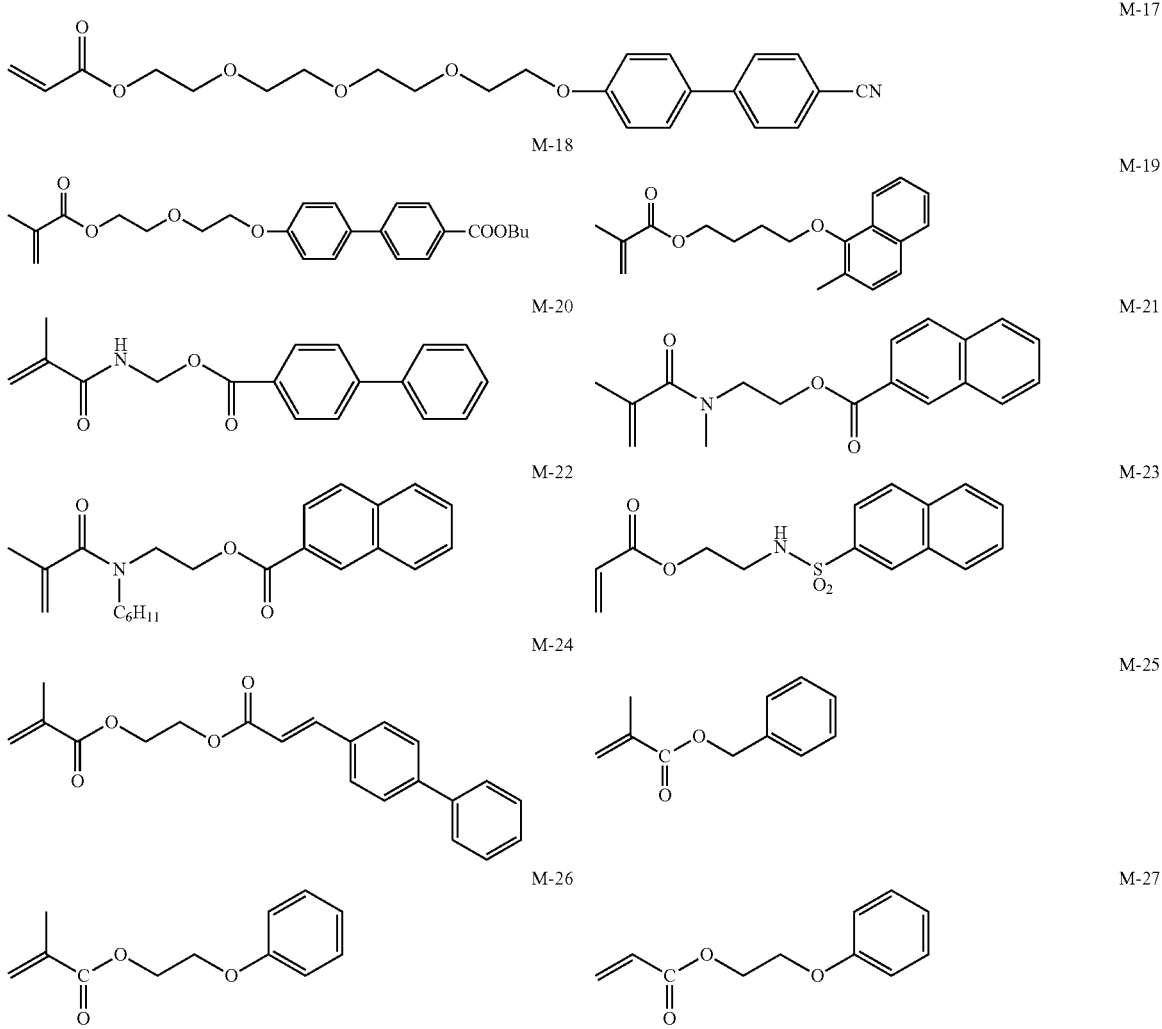

In the invention, the hydrophobic structural unit (a1) having an aromatic ring which is not directly bonded to the atom belonging to the main chain of the resin (A), is preferably a structural unit derived from one or more of benzyl methacrylate, phenoxyethyl acrylate or phenoxyethyl methacrylate, in consideration of the dispersion stability.

Hydrophobic Structural Unit (a2) Derived from Acrylic or Methacrylic Ester of Alkyl Having 1 to 4 Carbon Atoms In the resin (A), it is preferable that a hydrophobic structural unit (a2) derived from an acrylic or methacrylic ester of an alkyl having 1 to 4 carbon atoms is contained at an amount of at least 15 mass % or more. The amount of the hydrophobic structural unit (a2) is more preferably form 20 mass % to 60 mass %, and still more preferably from 20 mass % to 50 mass %.

Specific examples of such a (meth)acrylic ester include methyl(meth)acrylate, ethyl(meth)acrylate, (iso)propyl (meth)acrylate, and (iso or tertiary) butyl(meth)acrylate.

The number of the carbon atoms of the alkyl group is preferably from 1 to 4, and more preferably from 1 to 2.

Hydrophilic Structural Units (b)

The hydrophilic structural units (b) as a component of the resin (A) in the invention will be described below.

The content of the hydrophilic structural units (b) is from more than 0 mass % to 15 mass %, preferably from 2 mass % to 15 mass %, more preferably from 5 mass % to 15 mass %, and even more preferably from 8 mass % to 12 mass %, with respect to the total mass of the resin (A).

As hydrophilic structural units (b), the resin (A) includes at least a hydrophilic structural unit (b1) derived from acrylic acid and/or methacrylic acid. Further, the resin (A) may include a hydrophilic structural unit (b2) other than the hydrophilic structural unit derived from acrylic acid and/or methacrylic acid.

Hydrophilic Structural Unit (b1)

The content of the hydrophilic structural unit (b1) is adjusted based on the content of the after-mentioned structural unit (b2) or based on the amount of the hydrophobic structural units (a), or based on both of the above.

The resin (A) in the invention contains the hydrophilic structural units (a) at an amount of more than 80 mass % and the hydrophilic structural units (b) at an amount of 15% or less. The composition of the resin (A) is determined based on the respective contents of the hydrophobic structural units (a1) and (a2), the hydrophilic structural units (b1) and (b2), and the structural unit (c).

For example, when the resin (A) consists only of the hydrophobic structural units (a1) and (a2) and the hydrophilic structural units (b1) and (b2), the content of the structural unit (b1)

derived from acrylic acid and/or methacrylic acid can be obtained by the following formula:

Content of the structural unit $(b1)$=100−(mass % of the hydrophobic structural units $(a1)$ and $(a2)$)−(mass % of the structural unit $(b2)$)

In this case, the sum of (b1) and (b2) is 15 mass % or less.

Further, when the resin (A) consists of the hydrophobic structural units (a1) and (a2), the hydrophilic structural unit (b1), and the structural unit (c), the content of the hydrophilic structural unit (b1) can be obtained by the following formula:

Content of the structural unit $(b1)$=100−(mass % of the hydrophobic structural units $(a1)$ and $(a2)$)−(mass % of the structural unit $(c)$)

The resin (A) may consist only of the hydrophobic structural unit (a1), the hydrophobic structural unit (a2), and the hydrophilic structural unit (b1).

The hydrophilic structural unit (b1) can be obtained by polymerizing acrylic acid and/or methacrylic acid.

Either acrylic acid or methacrylic acid may be used singly, or a mixture of acrylic acid and methacrylic acid may be used.

The acid value of the resin (A) of the invention is preferably from 30 mg KOH/g to 100 mg KOH/g, more preferably 30 mg KOH/g to less than 85 mg KOH/g, and particularly preferably 50 mg KOH/g to less than 85 mg KOH/g, in consideration of the pigment dispersibility and storage stability.

Here, the acid value is defined as the weight (mg) of KOH required for completely neutralizing 1 g of the resin (A), and can be measured in accordance with the method described in JIS Standard (JIS-K0070 (1992); the disclosure of which is incorporated by reference herein).

Structural Unit (b2)

The structural unit (b2) preferably contains a nonionic hydrophilic group. The structural unit (b2) may be introduced into the resin (A) by polymerizing monomers (monomer groups) containing a monomer corresponding to the structural unit (b2), or by introducing a hydrophilic functional group into the polymer chain after formation of a polymer by polymerization.

The monomer for forming the structural unit (b2) is not specifically limited, as long as the monomer contains a functional group which can form a polymer, and a nonionic hydrophilic functional group, and any known monomers can be used. In consideration of the availability, handling properties and versatility, vinyl monomers are preferable.

Examples of the vinyl monomers include (meth)acrylic acid esters, (meth)acrylamides, and vinyl esters having a hydrophilic functional group.

Examples of the hydrophilic functional group include a hydroxyl group, an amino group, an amide group (in which the nitrogen atom is non-substituted), alkyleneoxide polymers, which will be described later, such as polyethylene oxide or polypropylene oxide.

Among these vinyl monomers, hydroxyethyl(meth)acrylate, hydroxybutyl (meth)acrylate, (meth)acrylamide, aminoethyl acrylate, aminopropyl acrylate, and (meth)acrylic acid esters containing an alkyleneoxide polymer, are particularly preferable.

It is preferable for the structural unit (b2) to contain a hydrophilic structural unit having an alkyleneoxide polymer structure.

The alkylene in the alkyleneoxide polymer is preferably an alkylene having 1 to 6 carbon atoms, more preferably 2 to 6 carbon atoms, and even more preferably 2 to 4 carbon atoms, in consideration of hydrophilicity.

The polymerization degree of the alkyleneoxide polymer is preferably from 1 to 120, more preferably from 1 to 60, and particularly preferably from 1 to 30.

It is also preferable that the structural unit (b2) is a hydrophilic structural unit containing a hydroxyl group.

The number of the hydroxyl groups in the structural unit (b2) is not specifically limited, but the number of the hydroxyl groups is preferably from 1 to 4, more preferably from 1 to 3, and particularly preferably from 1 to 2, in consideration of the hydrophilicity of the resin (A) and the compatibility with a solvent or other monomers at the time of polymerization.

Structural Unit (c)

As described above, the resin (A) of the invention may contain a structural unit (c) that is different from the hydrophobic structural units (a1) and (a2) and the hydrophilic structural unit (b) (hereinafter, sometimes referred to as simply a "structural unit (c)").

The structural unit (c) different from the hydrophobic structural units (a1) and (a2) and the hydrophilic structural unit (b) is a structural unit (c) having a structure different from all of the structures of the above-mentioned structural units (a1), (a2), and (b). The structural unit (c) is preferably a hydrophobic structural unit.

When the structural unit (c) is a hydrophobic structural unit, the structural unit (c) has to be different from the hydrophobic structural units (a1) and (a2).

The content of the structural unit (c) is preferably 35 mass % or less, more preferably 20 mass % or less, and even more preferably 15 mass % or less, with respect to the total mass of the resin (A).

The structural unit (c) can be introduced into the resin (A), for example by polymerizing monomers (monomer groups) containing a monomer corresponding to the structural unit (c), or by introducing a hydrophobic functional group into the polymer chain after formation of a resin by polymerization.

When the structural unit (c) is a hydrophobic structural unit, any known monomer may be used without limitation, as long as the monomer contains a functional group capable of forming a polymer and a hydrophobic functional group.

The monomer capable of forming the hydrophobic structural unit is preferably selected from vinyl monomers such as (meth)acrylamides, styrenes or vinyl esters, in consideration of availability, handling properties and versatility.

Examples of the (meth)acrylamides include N-cyclohexyl (meth)acrylamide, N-(2-methoxyethyl) (meth)acrylamide, N,N-diallyl(meth)acrylamide and N-allyl (meth)acrylamide.

Examples of the styrenes include styrene, methylstyrene, dimethylstyrene, trimethylstyrene, ethylstyrene, isopropylstyrene, n-butylstyrene, tert-butylstyrene, methoxystyrene, butoxystyrene, acetoxystyrene, chlorostyrene, dichlorostyrene, bromostyrene, and chloromethylstyrene; hydroxystyrene protected by a group (for example, t-Boc) that can be deprotected by an acidic material; methyl vinylbenzoate, α-methylstyrene, and vinyl naphthalene. Among them, styrene and α-methylstyrene are preferable Examples of the vinyl esters include vinyl esters such as vinyl acetate, vinyl chloroacetate, vinyl propionate, vinyl butyrate, vinyl methoxyacetate, and vinyl benzoate. Among them, vinyl acetate is preferable.

These monomers may be used singly, or in combination of two or more kinds thereof as a mixture.

The resin (A) in the invention may be a random copolymer in which the respective structural units are randomly introduced or a block copolymer in which the respective structural units are regularly introduced. When the resin (A) is a block copolymer, the order of introducing the respective structural units during the synthesis of the block polymer is not limited; further, the same structural unit may be used two or more times during the synthesis of the block copolymer. The resin (A) is preferably a random copolymer in consideration of the versatility and manufacturability.

The molecular weight of the resin (A) used in the invention is, in terms of a weight average molecular weight (Mw), preferably from 30,000 to 150,000, more preferably from 30,000 to 100,000, and still more preferably from 30,000 to 80,000.

When the resin (A) has a molecular weight within the above ranges, steric repulsion effect that the resin (A) can exerts as a dispersant may improve and the time it takes for the resin (A) to adsorb to the pigment may be shortened due to steric effect, which is preferable.

Further, the molecular weight distribution (weight average molecular weight/number average molecular weight) of the resin (A) used in the invention is preferably from 1 to 6, and more preferably from 1 to 4.

It is preferable for the molecular weight distribution to be set within the above ranges, in consideration of the dispersion stability and ejection stability of ink. Each of the number average molecular weight and the weight average molecular weight used herein is a molecular weight value obtained by (i) measuring a molecular weight with a GPC analyzer using columns of TSKgel GMHxL, TSKgel G4000HxL and TSKgel G2000HxL (trade names, manufactured by Tosoh Corporation) and (ii) converting the measured value using polystyrene as a reference material; the solvent used for GPC is THF and the detection is conducted by a differential refractometer.

The resin (A) used in the invention can be synthesized by various polymerization methods, such as a solution polymerization, a precipitation polymerization, a suspension polymerization, a bulk polymerization, or an emulsion polymerization. The polymerization reaction can be performed by known operations such as a batch system, a semi-continuous system or a continuous system.

The polymerization initiation method may be a method of using a radical initiator or a method of irradiating light or radiation, for example. These polymerization methods and the polymerization initiation methods are described, for example, in Teiji Tsuruta, *Kobunshi Gousei Houhou* (Polymer Synthesis Method), revised edition (Nikkan Kogyo Shimbun (1971)) and Takayuki Otsu and Masayoshi Kinoshita, *Koubunshi Gousei-no Jikken-ho* (Experimental Method of Polymer Synthesis), (Kagaku-Dojin (1972)), pp. 124-154.

Among these polymerization methods, the solution polymerization method using a radical initiator is particularly preferable. Examples of the solvent used in the solution polymerization method include ethyl acetate, butyl acetate, acetone, methyl ethyl ketone, methyl isobutyl ketone, cyclohexanone, tetrahydrofuran, dioxane, N,N-dimethylformamide, N,N-dimethylacetamide, benzene, toluene, acetonitrile, methylene chloride, chloroform, dichloroethane, methanol, ethanol, 1-propanol, 2-propanol, and 1-butanol.

These organic solvents may be used singly, or may be used in the form of a mixture of two or more kinds thereof, or may be mixed with water and used as a mixed solvent.

The polymerization temperature should be set in consideration of, for example, the molecular weight of the polymer to be formed and the kind of the initiator. In general, the polymerization temperature is from about 0° C. to about 100° C. It is preferable to perform polymerization at a temperature of from 50° C. to 100° C.

The reaction pressure can be suitably selected, and is usually from about 1 kg/cm² to about 100 kg/cm², and is preferably from about 1 kg/cm² to about 30 kg/cm². The reaction time may be from about 5 hours to about 30 hours. The obtained resin may be purified by reprecipitation or the like.

Preferable examples of the resin (A) of the invention are shown below, but the invention is not limited thereto.

$$-(CH_2-C(R^{11})(COO-CH_2-C_6H_5))_a-$$

$$-(CH_2-C(R^{21})(COOH))_b-\quad -(CH_2-C(R^{31})(COO-R^{32}))_c-$$

| | $R^{11}$ | $R^{21}$ | $R^{31}$ | $R^{32}$ | a | b | c | Mw |
|---|---|---|---|---|---|---|---|---|
| B-1 | $CH_3$ | $CH_3$ | $CH_3$ | —$CH_3$ | 60 | 10 | 30 | 46000 |
| B-2 | H | H | H | —$CH_3$ | 60 | 10 | 30 | 50000 |
| B-3 | $CH_3$ | $CH_3$ | $CH_3$ | —$CH_2CH_3$ | 61 | 10 | 29 | 43000 |
| B-4 | $CH_3$ | $CH_3$ | $CH_3$ | —$CH_2CH_2CH_2CH_3$ | 61 | 9 | 30 | 51000 |
| B-5 | $CH_3$ | $CH_3$ | $CH_3$ | —$CH_2(CH_3)CH_3$ | 60 | 9 | 31 | 96000 |
| B-6 | H | H | H | —$CH_2(CH_3)(CH_3)CH_3$ | 60 | 10 | 30 | 32000 |
| B-7 | $CH_3$ | $CH_3$ | $CH_3$ | —$CH_2CH(CH_3)CH_3$ | 60 | 5 | 30 | 75000 | a, b and c each represent a compositional ratio (mass %)

$$-(CH_2-C(R^{12})(COO-CH_2-CH_2-C_6H_5))_d-$$

$$-(CH_2-C(R^{22})(COOH))_e-\quad -(CH_2-C(R^{33})(COO-R^{34}))_f-$$

| | $R^{12}$ | $R^{22}$ | $R^{33}$ | $R^{34}$ | d | e | f | Mw |
|---|---|---|---|---|---|---|---|---|
| B-8 | $CH_3$ | $CH_3$ | $CH_3$ | —$CH_3$ | 55 | 12 | 33 | 31000 |
| B-9 | H | H | H | —$CH_2CH(CH_3)CH_3$ | 70 | 10 | 20 | 34600 | d, e and f each represent a compositional ratio (mass %)

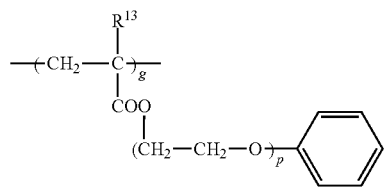
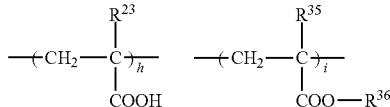
| | $R^{13}$ | p | $R^{23}$ | $R^{35}$ | $R^{36}$ | g | h | i | Mw |
|---|---|---|---|---|---|---|---|---|---|
| B-10 | CH₃ | 1 | CH₃ | CH₃ | —CH₃ | 60 | 9 | 31 | 35500 |
| B-11 | H | 1 | H | H | —CH₂CH₃ | 69 | 10 | 21 | 41200 |
| B-12 | CH₃ | 2 | CH₃ | CH₃ | —CH₃ | 70 | 11 | 19 | 68000 |
| B-13 | CH₃ | 4 | CH₃ | CH₃ | —CH₂(CH₃)CH₃ | 70 | 7 | 23 | 72000 |
| B-14 | H | 5 | H | H | —CH₃ | 70 | 10 | 20 | 86000 |
| B-15 | H | 5 | H | H | —CH₂CH(CH₃)CH₃ | 70 | 2 | 28 | 42000 |
g, h and i each represent a compositional ratio (mass %)
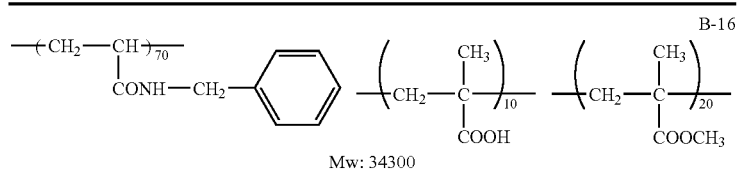
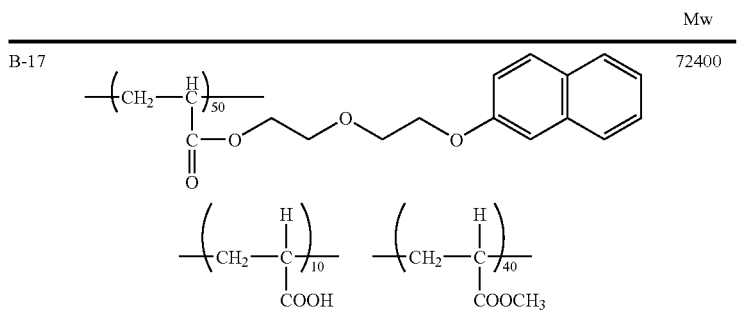
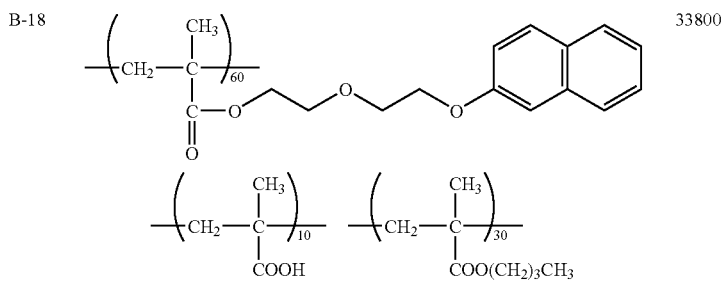
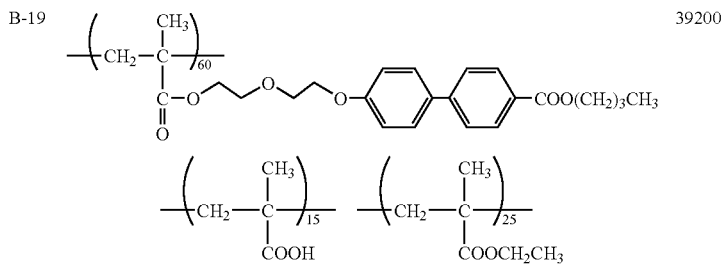

B-20

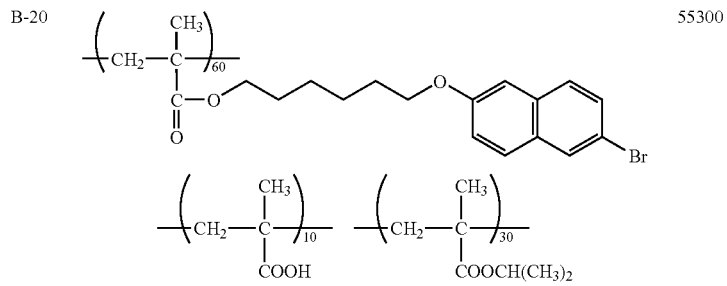

55300

Ratio of Resin Dispersant (Resin (A)) to Pigment

The ratio (weight ratio) of a resin dispersant (resin (A)) to a pigment (resin dispersant (resin (A))/pigment) is preferably from 25/100 to 140/100, and more preferably from 25/100 to 50/100. When the ratio of resin dispersant is 25/100 or more, the dispersion stability and rubbing resistance tend to be improved. When the ratio of the resin dispersant is 140/100 or less, the dispersion stability tends to be improved as well.

The weight average molecular weight of the resin dispersant (resin (A)) of the invention is preferably in from 2,000 to 60,000.

Polymer Latex

In the invention, it is preferable for the ink composition to contain a latex of resin particles (hereinafter sometimes referred to as polymer latex) in view of imparting fixability, rubbing resistance and cohesiveness, which prevents interference among applied ink droplets.

Polymer latexes usable in the invention include latexes of the following: an acrylic resin, a vinyl acetate resin, a styrene-butadiene resin, a vinyl chloride resin, an acryl-styrene resin, a butadiene resin, a styrene resin, a crosslinked acrylic resin, a crosslinked styrene resin, a benzoguanamine resin, a phenol resin, a silicone resin, an epoxy resin, a urethane resin, a paraffin resin or a fluororesin Among these resins, a latex of an acrylic resin, an acryl-styrene resin, a styrene resin, a crosslinked acrylic resin, or a crosslinked styrene resin is preferable.

In consideration of the stability of the ink composition, the weight average molecular weight of the resin in the polymer latex is preferably from 10,000 to 200,000, and more preferably from 100,000 to 200,000.

The average particle diameter of the resin particles is preferably from 10 nm to 1 μm, more preferably from 10 nm to 200 nm, even more preferably from 20 nm to 100 nm and particularly preferably from 20 nm to 50 nm.

The addition amount of the polymer latex in terms of solid content is preferably from 0.5 mass % to 20 mass %, more preferably from 3 mass % to 20 mass %, and even more preferably from 5 mass % to 15 mass %, with respect to the total amount of the ink composition, in consideration of fixability, rubbing resistance, and the viscosity of the ink composition.

In consideration of the preservation stability of the ink composition, the glass transition temperature Tg of the resin particles is preferably 30° C. or more, more preferably 40° C. or more, and even more preferably 50° C. or more.

The particle size distribution of the polymer latex is not specifically restricted. Therefore, a latex with a broad particle size distribution and a latex with a monodispersed particle size distribution are both usable. Moreover, two or more kinds of polymer latexes each having a monodispersed particle size distributions may be mixed and used as a mixture.

Surfactant

A surface tension adjusting agent can be added to the ink composition of the invention, if needed. Examples of the surface tension adjusting agent include a nonionic surfactant, a cationic surfactant, an anionic surfactant and a betaine surfactant. In order for the ink of the invention to be applied by inkjet system, the addition amount of the surface tension adjusting agent is such an amount that the surface tension of the ink of the invention is adjusted preferably to a range of from 20 mN/m to 60 mN/m, more preferably from 20 mN/m to 45 mN/m, and still more preferably from 25 mN/m to 40 mN/m.

As the surfactant of the invention, a compound having a structure in which a hydrophilic moiety and a hydrophobic moiety are included in a molecule can be effectively used. Any of an anionic surfactant, a cationic surfactant, an amphoteric surfactant, and a nonionic surfactant can be used. Furthermore, the above-mentioned polymer substance (polymer dispersant) is also usable as a surfactant.

Examples of the anionic surfactant include sodium dodecylbenzene sulfonate, sodium lauryl sulfate, a sodium alkyl diphenylether disulfonate, a sodium alkylnaphthalene sulfonate, a sodium dialkyl sulfosuccinate, sodium stearate, potassium oleate, sodium dioctylsulfosuccinate, a sodium polyoxyethylene alkylether sulfate, a sodium polyoxyethylene alkylphenylether sulfate, sodium dialkylsulfosuccinate, sodium stearate, sodium oleate, and sodium t-octylphenoxyethoxy-polyethoxyethyl sulfate. The anionic surfactant may be used singly, or in combination of two or more thereof.

Examples of the nonionic surfactant include acetylenediol derivatives such as an acetylenediol ethyleneoxide adducts, polyoxyethylene lauryl ether, polyoxyethylene octyl phenyl ether, polyoxyethylene oleyl phenyl ether, polyoxyethylene nonyl phenyl ether, oxyethylene-oxypropylene block copolymer, t-octyl phenoxyethyl polyethoxyethanol, and nonylphenoxyethyl polyethoxyethanol. The nonionic surfactant may be used singly, or in combination of two or more thereof.

Examples of cationic surfactant include a tetraalkyl ammonium salt, an alkylamine salt, a benzalkonium salt, an alkylpyridinium salt, and an imidazolium salt. Specific examples include dihydroxyethyl stearylamine, 2-heptadecenyl-hydroxyethyl imidazoline, lauryldimethyl benzyl ammonium chloride, cetyl pyridinium chloride, and stearamide methylpyridium chloride.

In view of preventing interference among applied ink droplets, nonionic surfactants are preferable, and in particular, acetylenediol derivatives are preferable.

The addition amount of the surfactants to be added to the ink composition of the invention is not specifically limited, but is preferably from 0.1 mass % or more, more preferably from 0.5 mass % to 10 mass %, and even more preferably from 1 mass % to 3 mass %.

Other Components

The ink composition of the invention may contain other additives. Examples of other additives include known additives such as an ultraviolet absorber, an anti-fading agent, an antifungal agent, a pH adjuster, an antirust agent, an antioxidant, an emulsion stabilizer, an antiseptic agent, a defoaming agent, a viscosity adjustment agent, a dispersion stabilizer or a chelating agent.

Examples of the ultraviolet absorber include a benzophenone ultraviolet absorber, a benzotriazole ultraviolet absorber, a salicylate ultraviolet absorber, a cyanoacrylate ultraviolet absorber, and a nickel complex salt ultraviolet absorber.

As anti-fading agents, various organic and metal complex anti-fading agents can be used. Organic anti-fading agents include hydroquinones, alkoxyphenols, dialkoxyphenols, phenols, anilines, amines, indans, chromanes, alkoxy anilines, and heterocycles. Examples of the metal complexes include a nickel complex and a zinc complex.

Examples of the antifungal agent include sodium dehydroacetate, sodium benzoate, sodium pyridinethione-1-oxide, ethyl p-hydroxybenzoate, 1,2-benzisothiazoline-3-one, sodium sorbate, and sodium pentachlorophenol. The content of antifungal agent in the ink composition is preferably from 0.02 mass % to 1.00 mass %.

The pH adjuster is not specifically limited as long as the pH adjuster can adjust a pH value to a desired value without exerting an adverse influence on a recording ink to which the pH adjuster is added. The pH adjuster may be selected appropriately in accordance with the purpose. Examples of the pH adjuster include alcohol amines such as diethanol amine, triethanol amine, or 2-amino-2-ethyl-1,3-propanediol; alkali metal hydroxides such as lithium hydroxide, sodium hydroxide, or potassium hydroxide; ammonium hydroxides such as ammonium hydroxide or quaternary ammonium hydroxide; phosphonium hydroxide; and alkali metal carbonates.

Examples of the antirust agent include acid sulfite, sodium thiosulfate, ammonium thiodiglycolate, diisopropyl ammonium nitrite, pentaerythritol tetranitrate, and dicyclohexyl ammonium nitrite.

Examples of the antioxidant include phenolic antioxidants (including hindered phenol antioxidants), amine antioxidants, sulfur antioxidants, and phosphorus antioxidants.

Examples of the chelating agent include sodium ethylenediamine tetraacetate, sodium nitrilotriacetate, sodium hydroxyethyl ethylenediamine triacetate, sodium diethylenetriamine pentaacetate, and sodium uramil diacetate.

Ink Set

The ink set of the invention includes at least one ink composition that is an ink composition of the invention.

The ink set of the invention is used in a recording method using the ink composition, and is, in particular, preferably used for an inkjet recording method. Further, the ink set of the invention may be used in the form of an ink cartridge in which the respective inks are accommodated integrally or in the form of a set of ink cartridges in which the respective inks are accommodated independently; the ink cartridge or the set of ink cartridges is preferable from the viewpoint of ease of handling. An ink cartridge containing an ink set or a set of ink cartridges containing an ink set is known in the art, and can be produced by appropriately using known methods.

An embodiment (a first embodiment) of the ink set of the invention is preferable in which the ink set of the invention includes plural ink compositions having respectively different colors, and all of the ink compositions are ink compositions according to the invention.

Further, another embodiment (second embodiment) of the ink set of the invention is also preferable in which the ink set includes at least one ink composition (hereinafter sometimes referred to as a "first ink composition") according to the invention and a second ink composition containing an aggregation promoter for promoting the aggregation of the pigment(s) in the at least one ink composition.

The ink set of the first embodiment can be used for forming a full-color image since the ink set includes plural ink compositions of respectively different colors. Further, the ink set of the first embodiment may have good liquid stability and ink ejecting property, and, when the ink set is used, curl of an inkjet recording medium after application of inks may be suppressed.

In order to form a full-color image, the plural ink compositions having respectively different colors preferably include a magenta color ink, a cyan color ink, and a yellow color ink. The plural ink compositions optionally include a black color ink in order to control a color tone. Moreover, the plural ink compositions optionally include at least one of a red ink, a green ink, a blue ink, a white ink, or an ink having a special color used in the printing field, which are different from the yellow, magenta and cyan inks.

The ink set of the second embodiment includes a pigment aggregation promoter in the second ink composition; therefore, the aggregation of the pigment is promoted when the first ink composition and the second ink composition are mixed on a recording medium, so that the pigment applied onto the recording medium is likely to remain on the surface of the recording medium and so that color formation of an image to be formed is excellent.

When an image is formed using the ink set of the second embodiment, the method of applying the first ink composition and the second ink composition onto a recording medium is not specifically restricted. The second ink composition may be applied onto the recording medium after the first ink composition is applied onto the recording medium, or vice versa.

The constitution of the second ink composition may be the same as that of the ink composition of the invention (first ink composition), except that the second ink composition contain the pigment aggregation promoter in place of the pigment.

The aggregation promoter contained in the second ink composition is not particularly limited as long as it promotes aggregation of a pigment. In particular, an acid is preferable in terms of aggregation speed.

The acid may be either an inorganic acid or an organic acid. The acid is preferably selected from polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyrone carboxylic acid, pyrrole carboxylic acid, furan carboxylic acid, pyridine carboxylic acid, coumalic acid, thiophene carboxylic acid, nicotinic acid, or the derivatives or salts thereof. These compounds may be used singly, or two or more kinds thereof may be used in combination.

Physical Property of Ink Composition

The surface tension of the ink composition of the invention is preferably from 20 mN/m to 60 mN/m in consideration of ink ejecting stability when the ink composition is used in an inkjet recording method. The surface tension is more preferably from 20 mN/m to 45 mN/m, and still more preferably from 25 mN/m to 40 mN/m.

The viscosity of the ink composition of the invention at 20° C. is preferably from 1.2 mPa·s to 15.0 mPa·s, more preferably from 2 mPa·s to less than 13 mPa·s and still more preferably from 2.5 mPa·s to less than 10 mPa·s.

Image Forming Method

The image forming method of the invention includes an ink applying process in which an ink composition is applied to a recording medium, by using the ink composition or the ink set of the invention.

The ink composition and ink set of the invention can be used for general writing materials, a recorder, a pen plotter and the like, but is particularly preferably used for an inkjet recording method.

In a preferable inkjet recording method in the invention, energy is supplied to an inkjet recording ink (ink composition) to form an image on a known image receiving material such as plain paper, resin coated paper, inkjet paper such as those described in JP-A-Nos. 8-169172, 8-27693, 2-276670, 7-276789, 9-323475, 62-238783, 10-153989, 10-217473, 10-235995, 10-217597 and 10-337947, a film, electrophotographic common paper, fabrics, glass, metal or ceramics. In addition, as an inkjet recording method applied to the invention, the inkjet recording method described in the paragraphs [0093] to [0105] of JP-A No. 2003-306623 is preferable.

When forming an image, a polymer latex compound may be used together for the purpose of imparting glossiness and water resistance or of improving weather-resistance. The time when the latex compound is applied to the image receiving material may be before, after, or simultaneously with application of a colorant. Accordingly, the latex compound may be added to an image receiving paper or added to an ink, or may be used as an independent liquid of the polymer latex. More specifically, methods described in JP-A No. 2002-166638 (Japanese Patent Application No. 2000-363090), JP-A No. 2002-121440 (Japanese Patent Application No. 2000-315231), JP-A No. 2002-154201 (Japanese Patent Application No. 2000-354380), JP-A No. 2002-144696 (Japanese Patent Application No. 2000-343944) and JP-A No. 2002-080759 (Japanese Patent Application No. 2000-268952) can be preferably used.

A preferable example of an image forming method according to the invention includes:

a first process—a process of applying an ink composition onto a recording medium (ink application process); and a second process—heating and fixing the applied ink composition after the ink composition is applied (heating and fixing process).

Further, at least one other additional process may be added to the image forming method. The additional process is not particularly limited, and may be suitably selected according to the purpose. An example of the additional process is a drying and removing process.

The heating and fixing process is not specifically restricted as long as latex particles contained in the ink used in the inkjet recording method are fused and fixed in the process, and the process may be suitably selected according to the purpose.

The drying and removing process is not specifically restricted as long as the solvent for ink in the ink composition applied to a recording medium is dried and removed by the process, and the process can be suitably selected according to the purpose.

The recording medium in the invention is not specifically restricted, and is, for example, plain paper, high quality paper, or coat paper.

Recorded products obtained through recording using the ink composition or the ink set of the invention may be image-recorded products in which curl is suppressed.

EXAMPLES

Hereinafter, the invention will be described in more detail with reference to examples, but the invention is not limited to the examples. Further, "parts" and "%" indicate quantities in terms of mass, unless otherwise specified.

Synthesis Example

Synthesis of Resin Dispersant P-1

A Resin Dispersant P-1 was Synthesized According to the Following Scheme.

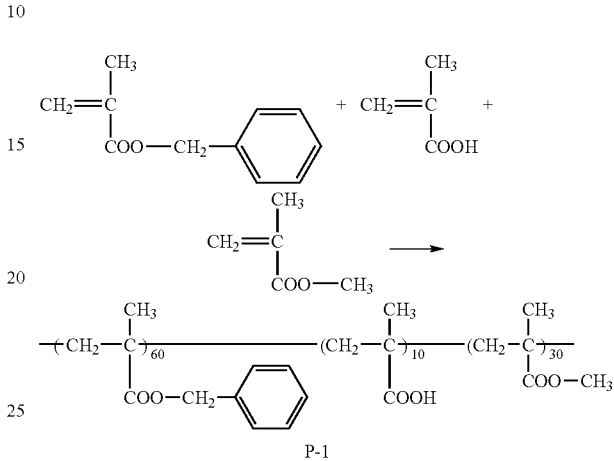

P-1

Methyl ethyl ketone (88 g) was placed in a 1000 ml three-neck flask equipped with a stirrer and a condenser tube, and heated to 72° C. under a nitrogen atmosphere. Separately, 0.85 g of dimethyl-2,2'-azobisisobutyrate, 60 g of benzyl methacrylate, 10 g of methacrylic acid, and 30 g of methyl methacrylate were dissolved in 50 g of methyl ethyl ketone to form a solution. The solution is added dropwise to the liquid in the flask over three hours. After the dropwise addition was completed, the reaction was further continued for one hour. Then, a solution obtained by dissolving 0.42 g of dimethyl 2,2'-azobisisobutyrate in 2 g of methyl ethyl ketone was added to the reaction solution, and the reaction solution was heated to 78° C. and heated at this temperature for 4 hours. The obtained reaction solution was reprecipitated twice with an excess quantity of hexane, and the precipitated resin was dried, whereby 96 g of dispersant P-1 was obtained.

Subsequently, the composition of the obtained resin was identified with 1H-NMR. The weight average molecular weight (Mw) was determined by a GPC method, and was found to be 44,600. Furthermore, the acid value of the polymer was obtained in accordance with the method described in JIS Standard (JIS-K0070 (1992), the disclosure of which is incorporated by reference herein), and was found to be 65.2 mgKOH/g.

Other resin dispersants in the invention can be synthesized in similar manners.

Preparation of Latex

Synthesis Example 1

19.8 g of a carboxylic acid salt emulsifier (LATEMUL ASK (trade name); manufactured by Kao Corporation), 6 g of an aqueous solution of sodium hydroxide (5 mol/l), and 0.3 g of 2,2'-azobis(2-amidinopropane) dihydrochloride were added to 120 g of water, and dissolved uniformly. The solution was heated to 70° C., and a monomer mixture of 25.9 g of styrene, 26.3 g of butyl acrylate and 5.1 g of acrylic acid was added to the solution over two hours in a stream of nitrogen, and thereafter, the resultant mixture was heated at 70° C. for two hours and then at 80° C. for three hours. After the mixture was cooled to room temperature, an aqueous solution of sodium hydroxide (1 mol/l) was added while stirring so as to attain a pH value of about 9, whereby latex PL-01 was obtained. The volume average particle diameter of the obtained latex was 115 nm. The solid content of the latex dispersion was 33 mass %.

Comparative Example 1

Dispersion of Pigment-Containing Resin Particles 10 parts by mass of Pigment blue 15:3 (Phthalocyanine Blue A220 (trade name), manufactured by Dainichiseika Color & Chemicals Mfg. Co., Ltd.), 5 parts by mass of the P-1 resin dispersant, 42 parts by mass of methyl ethyl ketone, 5.5 parts of an aqueous solution of NaOH (1N), and 87.2 parts of ion-exchanged water were mixed, and the mixture was dispersed by a bead mill for 2 to 6 hours using zirconia beads with a diameter of 0.1 mmϕ.

Methyl ethyl ketone was removed from the obtained dispersion at 55° C. under reduced pressure, and a part of the water was removed, whereby a dispersion including pigment-containing resin particles with a pigment concentration of 10.2 mass % was obtained.

Preparation of Ink Composition

Next, an ink composition having the following composition was prepared using the obtained dispersion of pigment-containing resin particles.

| | | |
|---|---|---|
| (1) | Dispersion of the pigment-containing resin particles | 30 parts |
| (2) | Latex PL-01 | 18.2 parts |
| (3) | Compound obtained by adding 3 mol of ethyleneoxy groups to 1 mol of sorbitol (SP value: 35.1) | 5 parts |
| (4) | DPGmBE (SP value: 20.5) | 4 parts |
| (5) | DEGmBE (SP value: 23.7) | 8 parts |
| (6) | Glycerin (SP value: 41.0) | 15 parts |
| (7) | Thiodiglycol (SP value: 31.2) | 2 parts |
| (8) | 1,5-pentanediol (SP value: 29.0) | 1 part |
| (9) | OLFIN E1010 (trade name, manufactured by Nisshin Chemical Industry Co. Ltd.) | 1 part |
| (10) | Ion-exchanged water | balance (to adjust the total amount of the composition to 100 parts) |

Evaluation of Ink Composition
Dispersion Stability

The particle diameter and the viscosity of the ink composition obtained above were measured when the ink composition had been stored at a thermostat oven at 60° C. for 14 days, and the following conditions were evaluated. The results are shown in Table 1.
(1) Whether a change in particle diameter is within 10 nm of the initial particle diameter
(2) Whether a change in viscosity is within 10% of the initial viscosity
Evaluation Criteria
A: Both conditions (1) and (2) are satisfied;
B: Either condition (1) or (2) is satisfied;
C: Neither condition (1) nor (2) is satisfied.

Measurement of Diameter of Particles

The volume average particle diameter of the obtained pigment dispersion was measured by a dynamic light scattering method using NANOTRAC particle size distribution measuring device UPA-EX150 (trade name, manufactured by Nikkiso Co., Ltd.). Measurement conditions: a test solution was prepared by adding 10 cc of ion-exchanged water to 10 μl of the aqueous ink composition, and the test solution was measured at 25° C.

Measurement of Viscosity

The viscosity of the aqueous ink composition was measured using VISCOMETER TV-22 (trade name, manufactured by Toki Sangyo Co., Ltd.) at 25° C.

DIMATIX MATERIAL PRINTER DMP-2831 (trade name, manufactured by Fuji Film Dimatix Inc.) that was equipped with a 10 pl ejection cartridge DMC-11610 (trade name, manufactured by Fuji Film Dimatix Inc.) and that was modified to allow liquid supply from the outside was used as an inkjet recording apparatus. The following items were evaluated. As a recording medium, TOKUBISHI ART double-sided N (trade name, manufactured by Mitsubishi Paper Mills, Ltd.) (basis weight: 84.9 g/m$^2$) was used.

Curl

A solid image was printed on the inkjet recording medium in an ink coating amount of 5 g/m$^2$, and then a strip having a size of 5 mm×50 mm was cut out of the inkjet recording medium such that the length direction of the strip is in the direction of curl, and the strip was allowed to stand for 24 hours at a temperature of 25° C. and a relative humidity of 50%. Then, a curling behavior (curl value) was measured. The evaluation results are shown in Table 1.

Evaluation Criteria
A: Curvature C does not exceed 20
B: Curvature C exceeds 20

Method of Measuring Curvature

The sample strip having a size of 5 mm×50 mm, the length of 50 mm being in the curling direction, was measured with a curl measurement plate, and a curl value (C) was read. The curl of the sample was regarded as an arc of a circle with a radius of R, and the curl was calculated according to the equation, $C=1/R(m)$.

Ejection Stability

When printing was performed using the inkjet recording apparatus, the ink ejection stability was evaluated as to whether they satisfy the following conditions. The unevenness of the image was inspected visually.
(1) Ink ejection rate is 90% or more after a 60-minute continuous ink ejection test
(2) After ink is ejected for one minute and ink ejection is suspended for 30 minutes, ink ejection rate is 90% or more
(3) Image unevenness is not observed
Evaluation Criteria
A: The above three conditions are satisfied
B: Two of the above conditions are satisfied
C: At least two of the above conditions are not satisfied Comparative Examples 2 to 7 and Examples 1 to 4

Ink compositions were obtained in the same manner as in Comparative Example 1, except that the solvents described in Table 1 were used in place of the solvents (3) to (8) in the ink composition of Comparative Example 1.

TABLE 1

| | (a) Water-soluble solvent Compositional Ratio (amount of water-soluble solvent in the total mass of ink (SP Value/mass %) | Amount of water-soluble solvent in the total mass of ink (mass %) | Amount of solvent (mass %) with SP value of less than 27.5 in total water-soluble solvent | Evaluation Curl | Dispersion Stability | Ejection Stability |
|---|---|---|---|---|---|---|
| Comparative Example 1 | Compound obtained by adding 3 mol of ethyleneoxy groups to 1 mol of sorbitol (35.1/5%) DPGmBE (20.5/4%) DEGmBE (23.7/8%) Glycerin (41.0/15%) Thiodiglycol (31.2/2%) 1,5-pentanediol (29.0/1%) | 35 | 34 | B | B | A |
| Comparative Example 2 | DPGmME (21.3/64%) | 64 | 100 | A | C | B |
| Comparative Example 3 | Glycerin (41.0/21%) Compound 1 (l + m + n ≈ 9) (21.7/0.5%) PGmBE (15.81/5%) | 26.5 | 21 | B | B | A |
| Comparative Example 4 | Compound 1 (AO = ethyleneoxy; l + m + n ≈ 1) (34.5/15%) | 15 | 0 | B | A | A |
| Comparative Example 5 | Compound 1 (AO = propyleneoxy; l + m + n ≈ 18) (19.9/25%) | 25 | 100 | A | B | C |
| Comparative Example 6 | Triethylene glycol (27.8/20%) | 20 | 0 | B | A | A |
| Comparative Example 7 | Compound 1 (AO = propyleneoxy; l + m + n ≈ 3) (26.4/20%) Glycerin (41.0/5%) | 25 | 80 | B | A | A |
| Example 1 | Compound 1 (AO = propyleneoxy; l + m + n ≈ 9) (21.7/15%) | 15 | 100 | A | A | A |
| Example 2 | Compound 1 (AO = propyleneoxy; l + m + n ≈ 3) (26.4/27%) | 27 | 100 | A | A | A |
| Example 3 | Compound 1 (AO = ethyleneoxy; l + m + n ≈ 6) (25.6/20%) | 20 | 100 | A | A | A |
| Example 4 | Compound 1 (AO = propyleneoxy; l + m + n ≈ 3) (26.4/25%) Glycerin (41.0/1%) | 26 | 96 | A | A | A |

Details of the materials used in the Examples and the Comparative Examples are shown below.
Compound 1: A compound represented by Formula (1) in which the kind of AO and the value of l+m+n are as shown in Table 1
DPGmBE: Dipropylene glycol monobutyl ether
DEGmBE: Diethylene glycol monobutyl ether
DPGmME: Dipropylene glycol monomethyl ether
PGmBE: Propylene glycol monobutyl ether As is clear from Table 1, not all of the evaluated items (curl, dispersion stability and ejection stability) are good in the Comparative Examples, but all of the evaluated items are excellent in Examples of the invention.

According to the invention, an ink composition having an excellent liquid stability and liquid ejection property may be obtained, with which curl of a recording medium after ink is applied onto the recording medium can be suppressed.

Further, according to the invention, an ink set including plural ink compositions having different colors from each other is provided, which has an excellent liquid stability and liquid ejection property and with which curl of a recording medium after ink is applied onto the recording medium can be suppressed.

Furthermore, according to the invention, an image forming method using the ink composition or the ink set is provided, in which curl of a recording medium after the ink is applied onto a recording medium can be suppressed.

All publications, patent applications, and technical standards mentioned in this specification are herein incorporated by reference to the same extent as if each individual publication, patent application, or technical standard was specifically and individually indicated to be incorporated by reference.

What is claimed is:

1. An ink composition, comprising:

a water-soluble solvent;

a pigment; and water, the total content of water-soluble solvent comprising a water-soluble solvent having an SP value of 27.5 or less at an amount of 90 mass % or more and a compound represented by the following Formula (1), wherein the compound represented by Formula (1) is the same as or different from the water-soluble solvent having an SP value of 27.5 or less:

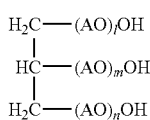

Formula (1)

wherein, in Formula (1), l, m and n each independently represent an integer of 1 or more, the total of l, m and n is from 3 to 15, and AOs each independently represents a propyleneoxy group, and wherein the compound that is represented by Formula (1) and has an SP value of 27.5 or less is from 50 mass % to less than 100 mass % with respect to the total amount of the water-soluble solvent.

2. The ink composition of claim 1, wherein the total of l, m and n is from 3 to 10.

3. The ink composition of claim 1, wherein the amount of the water-soluble solvent is from 10 mass % to 30 mass % with respect to the total amount of the ink composition.

4. The ink composition of claim 1, wherein particles of the pigment have a polymer covering formed by phase inversion emulsification.

5. The ink composition of claim 4, wherein a resin (A) is used as a dispersant in the phase inversion emulsification, and the resin (A) comprises hydrophobic structural units (a) and hydrophilic structural units (b);

the hydrophobic structural units (a) include a hydrophobic structural unit (a1) having an aromatic ring which is not directly bonded to an atom belonging to the main chain of the resin (A) at an amount of 40 mass % or more and a hydrophobic structural unit (a2) derived from an acrylic or methacrylic ester of an alkyl having 1 to 4 carbon atoms at an amount of 15 mass % or more; and the hydrophilic structural units (b) include a hydrophilic structural unit (b1) derived from acrylic acid and/or methacrylic acid, and the hydrophilic structural units (b) are contained at an amount of 15 mass % or less with respect to the total amount of the resin (A).

6. The ink composition of claim 1, further comprising a latex.

7. An ink set, comprising the ink composition of claim 1.

8. An ink set comprising a plurality of ink compositions and the plurality of ink compositions have different colors from each other, wherein said ink compositions comprise:
a water-soluble solvent;
a pigment; and
water,
wherein the total content of water-soluble solvent comprising a water-soluble solvent having an SP value of 27.5 or less at an amount of 90 mass % or more and a compound represented by the following Formula (1), wherein the compound represented by Formula (1) is the same as or different from the water-soluble solvent having an SP value of 27.5 or less:

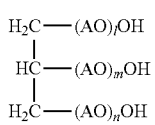

Formula (1)

wherein, in Formula (1), l, m and n each independently represent an integer of 1 or more, the total of l, m and n is from 3 to 15, and AOs each independently represents a propyleneoxy group, and wherein the compound that is represented by Formula (1) and has an SP value of 27.5 or less is from 50 mass % to less than 100 mass % with respect to the total amount of the water-soluble solvent.

9. An ink set comprising a first ink composition, which comprises,
a water-soluble solvent;
a pigment; and
water,
the total content of water-soluble solvent comprising a water-soluble solvent having an SP value of 27.5 or less at an amount of 90 mass % or more and a compound represented by the following Formula (1), wherein the compound represented by Formula (1) is the same as or different from the water-soluble solvent having an SP value of 27.5 or less:

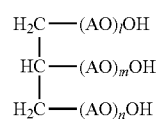

Formula (1)

wherein, in Formula (1), l, m and n each independently represent an integer of 1 or more, the total of l, m and n is from 3 to 15, and AOs each independently represents a propyleneoxy group, and wherein the compound that is represented by Formula (1) and has an SP value of 27.5 or less is from 50 mass % to less than 100 mass % with respect to the total amount of the water-soluble solvent; and further comprising another ink composition containing an aggregation promoter for the pigment in said first ink composition.

10. The ink set of claim 9, wherein the aggregation promoter is an acid.

11. An image forming method, comprising applying the ink composition of claim 1 to a recording medium.

12. An image forming method, comprising using the ink set of claim 7 to apply the ink composition to a recording medium.

13. The image forming method of claim 11, wherein a heating process is performed after the application of the ink composition.

14. The image forming method of claim 12, wherein a heating process is performed after the application of the ink composition.

15. The ink composition of claim 1, further comprising a resin (A) as a dispersant for dispersing the pigment, wherein the resin (A) comprises hydrophobic structural units (a) and hydrophilic structural units (b);

the hydrophobic structural units (a) comprise at least a hydrophobic structural unit (a1) having a structure represented by the following Formula (2):

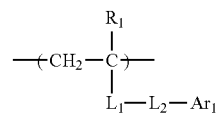

Formula (2)

wherein, in Formula (2), $R_1$ represents a hydrogen atom, a methyl group or a halogen atom; $L_1$ represents —COO—, —OCO—, —CONR$_2$—, —O—, or a substituted or unsubstituted phenylene group wherein the left side in each structure corresponds to the main chain side; $R_2$ represents a hydrogen atom or an alkyl group having 1 to 10 carbon atoms; $L_2$ represents a single bond or a divalent linking group having 1 to 30 carbon atoms; and $Ar_1$ represents a monovalent group derived from an aromatic ring.

16. The ink composition of claim 15, wherein, in Formula (2), $Ar_1$ represents a monovalent group derived from a benzene ring.

17. The ink composition of claim 15, wherein, in Formula (2), $R_1$ represents a hydrogen atom, or a methyl group; $L_1$ represents —COO— the left side of which represents the main chain side; and $L_2$ represents —$(CH_2-CH_2-O)_n$— where n represents the average number of repeating units and is from 1 to 6, the left side of the chemical formula representing the main chain side.

\* \* \* \* \*